Sept. 30, 1941.                C. T. CUTTING                 2,257,160
                            STICK HOLDING DEVICE
                          Filed March 26, 1941            2 Sheets-Sheet 1
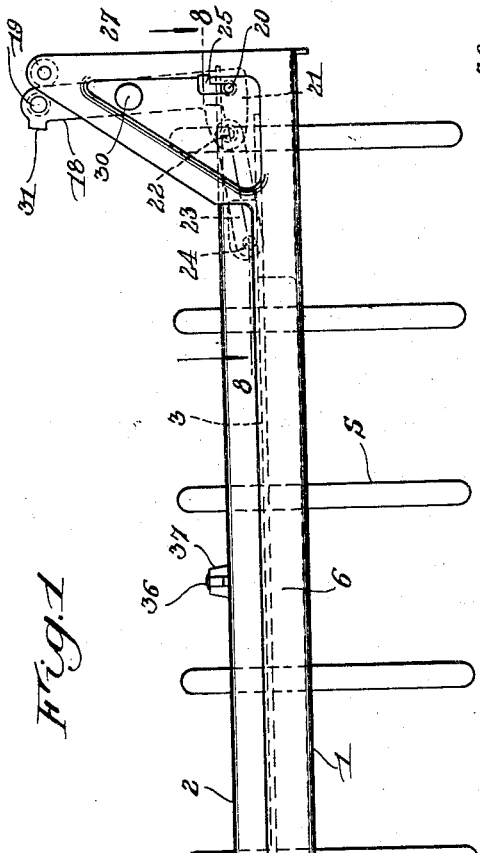
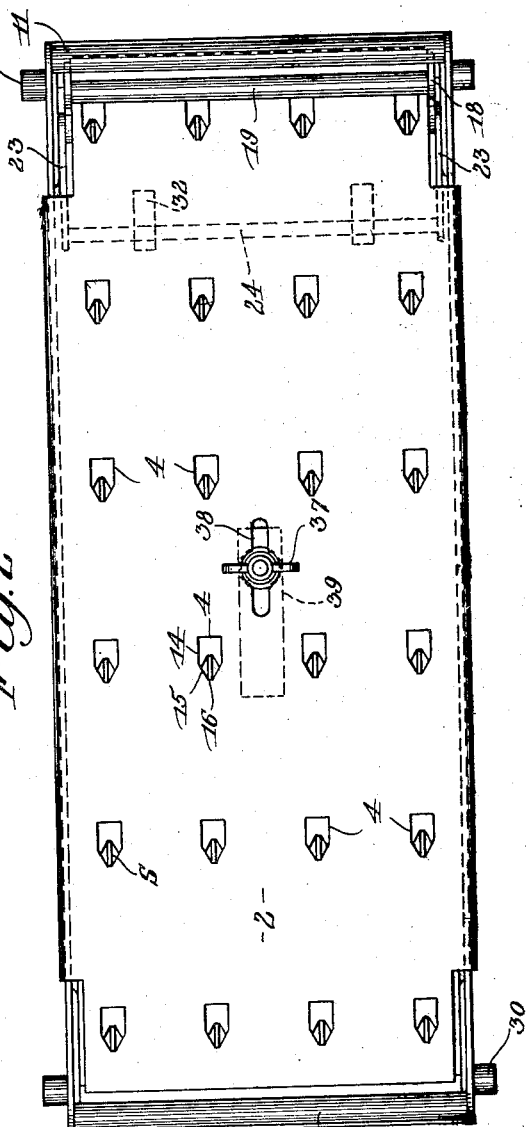
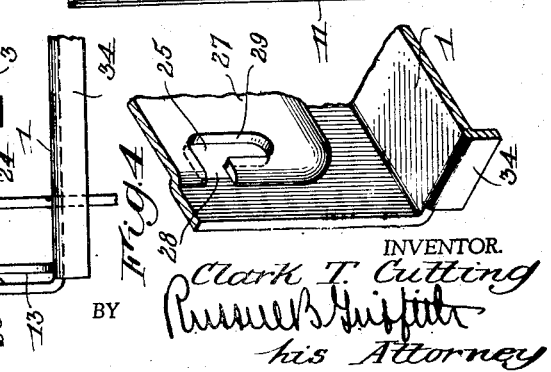
INVENTOR.
Clark T. Cutting
BY Russell B. Griffith
his Attorney Sept. 30, 1941.   C. T. CUTTING   2,257,160
STICK HOLDING DEVICE
Filed March 26, 1941   2 Sheets-Sheet 2
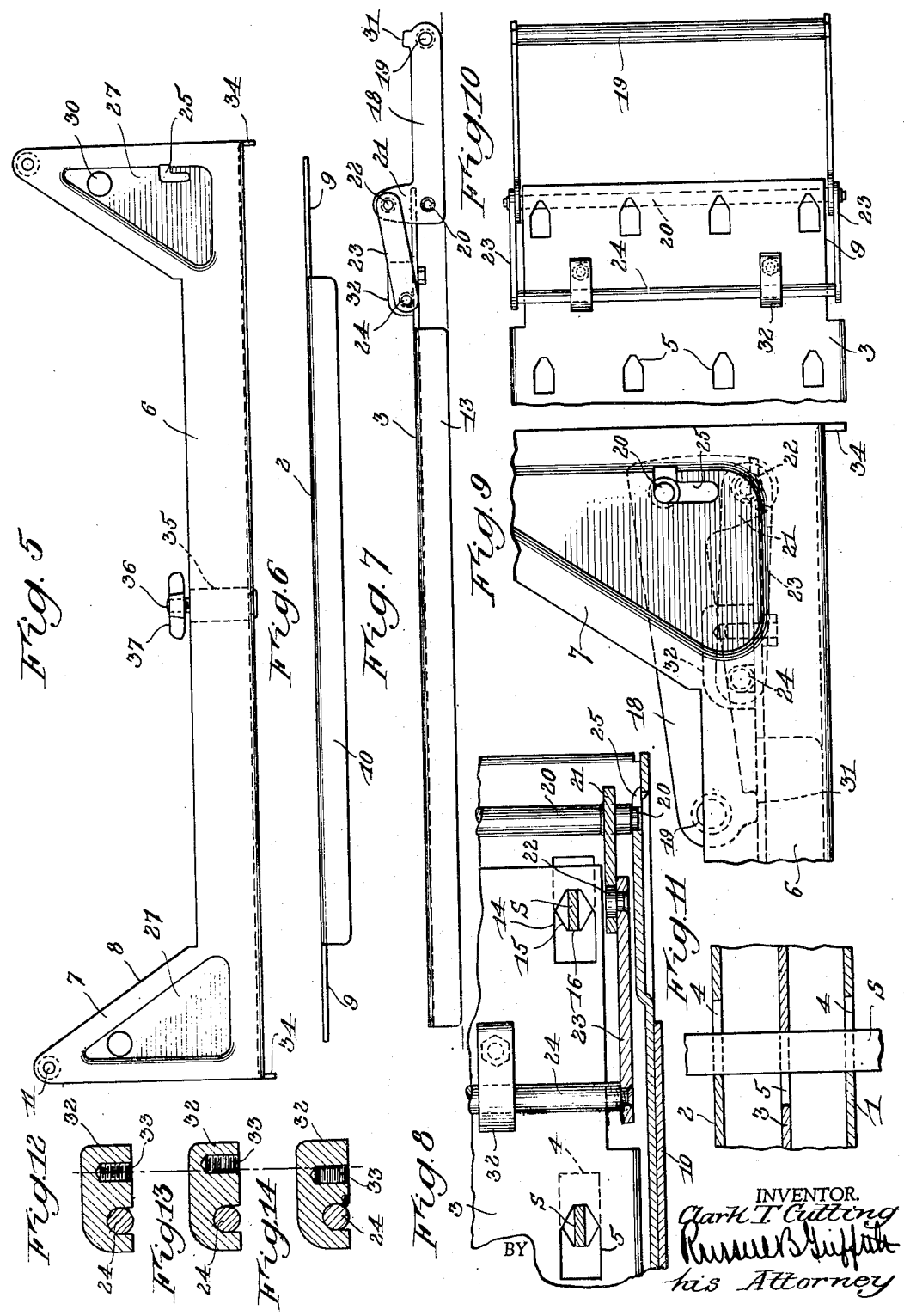
INVENTOR.
Clark T. Cutting
BY
his Attorney Patented Sept. 30, 1941

2,257,160

UNITED STATES PATENT OFFICE 2,257,160

STICK HOLDING DEVICE

Clark T. Cutting, Canandaigua, N. Y.

Application March 26, 1941, Serial No. 385,322

10 Claims. (Cl. 294—87)

My present invention relates to dipping devices and more particularly to holders whereby a multiplicity of sticks may be assembled in gangs, temporarily clamped in desired spaced relationship, dipped in unison and finally simultaneously released. Such devices, for instance, are used in the manufacture of confections where material such as ice cream is accumulated upon a stick that serves as a carrier and also as a handle for the user. In the manufacture of milk products particularly, sanitation is an important consideration and a broad object of my present invention is to provide a serviceable and conveniently manipulatable stick holder of the general character indicated, the component parts of which can be readily disassembled for thorough cleaning and sterilization of all of their surfaces and as readily reassembled. The sticks referred to are usually fashioned from flat wooden pieces and a further object of my invention is to so form the clamping mechanism of my device that while the sticks will be sufficiently firmly held they will not be mutilated in such manner as would tend to prevent them from being vented freely from the machine after the dipping operation or would produce splinters uncomfortable to the hand or the lips of the consumer.

To these and other ends, the invention resides in certain improvements and combination of parts, all as will be hereinafter more fully described, the novel features being pointed out in the claims at the end of this specification.

In the drawings:

Figure 1 is a side elevation of a stick holding device constructed in accordance with and illustrating one embodiment of my invention, the same being assembled with the parts in operative position and a plurality of sticks being shown held thereby;

Figure 2 is a top plan view thereof;

Figure 3 is an enlarged, fragmentary end view;

Figure 4 is an enlarged, fragmentary perspective of the detachable pivotal connection of the actuating means;

Figure 5 is a side elevation of the lower supporting plate and attached parts taken alone;

Figure 6 is a side elevation of the upper supporting plate taken alone;

Figure 7 is a side elevation of the intermediate clamping plate taken alone;

Figure 8 is an enlarged, fragmentary, horizontal, sectional view taken substantially on the line 8—8 of Figure 1;

Figure 9 is an enlarged, fragmentary side view of the clamp actuating end of the holder as it appears in Figure 1, except that the actuating mechanism is in released position for disassembly;

Figure 10 is a fragmentary, top plan view of the clamping plate and its actuating mechanism as it appears in Figure 7;

Figure 11 is an enlarged, fragmentary section through the body of the holder showing an individual stick supporting and clamping group of parts; and Figures 12, 13 and 14 are enlarged, detailed, vertical, sectional views, respectively, of interchangeable bearing blocks constituting a part of the actuating mechanism.

Similar reference numerals throughout the several views indicate the same parts.

Referring more particularly to the drawings, the general assembly in the present embodiment comprises essentially three sheet metal stampings, namely, a bottom supporting plate 1, and upper supporting plate 2 and an intermediate clamping plate 3. In operation the upper and lower supporting plates 1 and 2 are relatively fixed and have a multiplicity of alined perforations 4 therein, the details of which will be later described. The intermediate clamping plate 3 is longitudinally slidable relative to the other two and has perforations 5 therein only generally coinciding with the perforations 4 in the supporting plates. The idea is that the latter constitute sockets in which a multiplicity of the flat sticks S, appearing in Figures 1, 3 and 11, are inserted in gangs to project downwardly a definite desired distance for the dipping operation. After the sticks have been so inserted a throw of the intermediate clamping plate 3 grips them and holds them securely in place. At the conclusion of the dipping operation, this clamping plate is retracted to release or vent the sticks and permit them and their confectionary or other accumulations to drop out of the device and make room for a fresh set.

The lower holding plate 1 is in the nature of a tray to the extent that it is open at the ends but at the sides has upwardly extended flanges 6 which, at the extremities terminate in triangular portions 7. Obviously, therefore, the inward inclines 8 of these triangular portions merge with the flanges 6. Otherwise, the ends of portions 7 may rise vertically as indicated.

At this point, turning to the other supporting plate 2, this is in fact a plate except that, with the exception of cutaway portions 9 at the two ends, it has depending side flanges 10 that slip over and engage outwardly with the said flanges 6 of the lower holding tray 1. The point that I bring out here is, that when upper supporting plate 2 is dropped down upon lower traylike supporting plate 1, the shoulders provided by the flanged portions 10 and the cutaway portions 9, will engage the inclines 8 and thereby be urged to an exact position, easily and accurately so that upper plate 2 will lie on lower tray plate 1 in a position in which the aforesaid socket perforations 4 in the two of them will be in alinement.

One reason for the provision of the triangular extensions 7 rising from the tray holder 1 and its side flanges 6 is to form posts for the connection of transverse handles 11 connecting these triangular pieces at each end. In this connection, laterally projecting trunnions 12 on the same triangular portions may be explained to be supports on the tray for suspending the device as a whole over receptacles in connection with which the dipping operation is carried on.

Thus it is that by means of the handles 11 the operator drops the tray until the trunnions 12 engage a suitable support after the sticks S shown in Figure 1 in positions described, have been inserted and secured.

The securing means last referred to, involves the clamping plate 3. Having referred to the fact that lateral flanges 10 of upper supporting plate 2 telescope with or similarly engage the side flanges 6 of lower supporting plate 1, it is now explained that in a somewhat similar manner lateral flanges 13 on intermediate clamping plate 3 parallel flanges 6 and 10 and lie inside of both and form sliding supports whereby the said clamping plate is intermediately supported by its flanges 13 upon the bottom of traylike bottom plate 1.

Reference has been made to the fact that clamping plate 3 has perforations 5 alined in a general way with the perforations 4 in upper and lower holding plates 2 and 1. It may be here explained that, as a part of my invention, the said perforations 4 (Figure 2) consist of large openings with parallel sides 14 merging into inclines 15. As the latter converge the said perforation is terminated by a relatively rectangular or cross wall 16. All of the aforesaid intersections are angular.

The reason for these specific references is to bring out a particular gripping action upon the sticks S that I have shown in the several figures. As shown in Figure 8, particularly, such sticks S are rectangular in cross section. In other words, they are flat sticks with square edges at the ends or thinner sides. The perforations 4, just described, in the supporting plates 1 and 2 are not inconsistent with this formation. As a matter of fact, they correspond to it to the extent that where the converging portions 15 of perforations 4 meet the square ends 16 the widths of the latter are the same as or greater than the thickness of the sticks. The point to be made with reference to these socket perforations is that while the converging side portions 15 act as guides in the clamping of the sticks they have no part in the actual clamping action. These, on the other hand, simply straighten the sticks longitudinally of the device so that such sticks abut the flat ends 16 of the perforations squarely without thereupon or thereafter locking with the inclined surface 15 at all.

The perforations 5 in the intermediate sliding clamping plate 3 are of the same shape as those in the supporting plates but directionally reversed so far as their tapered ends are concerned. With respect thereto the following results therefore occur in operation:

When the sticks S are inserted in the sockets 4 the attenuated ends of the perforations 5 in the intermediate clamping plate 3 move against one square edge of the sticks. They thereby force the latter against the attenuated ends of the perforations 4 of the supporting plates and carry the opposite square edges of the plates squarely against the straight edges 16 of these perforations. Hence, the, what we may call the sharp corners of the sticks, are not engaged at all. On the other hand, and quite oppositely, the square end surface 17 of the clamping plate 3 engages squarely the flat edges of the sticks on one side and forces them against the similarly square edges 16 on the perforations of the supporting plates. The result is that there is no splintering; a slight square indentation is made on the opposite narrow sides of the sticks and when the intermediate clamping plate is released the sticks may all be readily, instantly and completely vented or dropped without hesitation on the part of any of them, and the slight indentations in the fibers thereof that result from the joint squeezing between supporting plates 1 and 2 and clamping plate 3 is hardly noticeable. Yet they have been effective during the dipping operation to hold all of the sticks securely.

I have diverged in the foregoing description in order to explain this exact clamping movement in order to make clear the following description of the operating and actuating mechanism whereby I obtain this simple, positive, short and yet exact movement of the said intermediate clamping plate 3 whereby it performs these functions in this particular way. In Figure 11, I have attempted to show how a particular stick is thus gently, but firmly, gripped between lower plate 1, upper plate 2 and intermediate clamping plate 3. Proceeding now to a particular description of the said actuating mechanism for intermediate clamping plate 3, this comprises a pair of operating levers 18 connected by a bail or handle 19 similar to the handle 11 connecting the triangular ends 7 of the bottom supporting tray 1 as heretofore described. In other words, in the joint manipulations this bail or connecting member 19 is generally adjacent to one of the handles 11. Operating levers 18 are fixedly pivoted at 20 to the side flanges 13 of clamping member 3. They are in the nature of bell cranks and have arms 21 pivoted at 22 to links 23 that in turn are pivoted at 24 to clamping plate 3.

At this point, attention is called to the fact that pivot 24 is a cross-wise bar or shaft that has a particular bearing connection with the said plate 3. As will later appear and as is suggested in the link and lever movement just described, the throw of clamping plate 3 depends upon just how shaft 24 and its bearings are arranged with regard to link 23 and lever 18. The general object concerned is the movement of this clamping bar 3 to and/or over a center between the pivotal connections 22 and 24 of the links 23 whereby clamping element 3 will move sufficiently but not too far in engagement with the sticks S to hold, but not, at the same time, disfigure the same.

Going back to this recent description, clamping plate 3 for disassembly has its operating lever 18 laid out as in Figure 7. When the connecting bar or bail 19 of operating levers 18 is brought up into operative position, as in Figure 1, it has an adjacent common gripping and lifting relationship with fixed bail bar 19 connecting the triangular portions 7 of bottom tray holder 1.

The manner in which clamping plate 3, its operating lever 18, and the connecting actuating links 23 are caused to function is exemplified in a comparison of the relative positions of the parts shown, for instance, in Figures 1, 2, 5 and 7.

Going back to pivots 20 on operating levers 18, these occupy bearings in the triangular portions 7 of the under tray support 1. Such bearings comprise bayonet slots 25 in inwardly offset stamped triangular portions 27 in extension posts 7. As best shown in Figures 1, 2 and 4, particularly Figure 4, a triangular portion 27 is stamped inwardly at the centers of posts 7 on holding plate 1. These have the bayonet slots heretofore generally referred to at 25, the slots including entrance portions 28 and relatively downwardly extending bearing portions 29. In other words, the stamped portions 27 constitute inwardly projecting cheeks on posts 7. The aforesaid projecting pivots 20 constituting the primary fulcrums of operating levers 18, engage in and turn upon these said offset bearings 29. Nevertheless, it is to be observed from a comparison of Figures 2 and 10 that when clamping plate 3 is inserted endwise between supporting plates 1 and 2 upon the assembly of the latter as described, projecting pivots or trunnions 20 of operating levers 18 have an opportunity to and do enter the horizontal portions 28 of the bayonet slots 25 and thence drop down to the bearing portions 29.

To recapitulate, the triangular sheet metal posts 7 have these depressions 27 struck inwardly therefrom; such depressions are slotted at 25, the fulcrum pivots 20 of the operating levers 18 of clamping plate 3 readily enter the same; drop down to the bearings so provided, and there function in the manner heretofore described.

It is here explained that clamping plate 3 carrying all this actuating mechanism, aside from its depending bearing flanges 13 is cut away at the proper points at its ends to take care of the actuator mechanism carried by it. This is shown clearly in Figure 2 in connection with the further showing of which it is explained that the elements 30 are merely projecting studs suitably riveted in depressions 27 and projecting outwardly to gain support on the receiving receptacles in connection with which my dipping device is used.

In assemblying plates 1, 2 and 3, plate 2, being the upper cover plate, is dropped in place last in the manner hereinbefore described. Previously thereto, intermediate clamping plate 3 is simply slid in from the right hand end of the structure of holding plate 1 as it appears in Figure 5. Projecting trunnion bearing 22 is alined with slot 28 and finally drops into bearing slot 29 of the general bayonet slot arrangement 25. Clamping plate 3 is then in the individual position of Figure 7. When, however, it is desired to disassemble clamping plate 3, the operating lever 18 is thrown over to the inoperative position of Figure 9. The pivot points between the critical centers are such that thereupon an abutment 31 on operating lever 18 stops against clamping plate 3. It is here that the sticks S are released and vented. Upon the contact aforesaid, pivot trunnions 22 are automatically raised to alinement with the bayonet slot portions 28 and hence the actuating linkage solely supported on clamping plate 3 can be easily withdrawn endwise from the machine.

Early reference was made to the fact that the movement of intermediate clamping plate 3 against an intermediate portion of each stick S, as shown in Figure 11, was such that the stick would be firmly pressed into the narrowed gripping portions of plates 1 and 2 and yet not be mutilated. These sticks being supplied from the wood mill in great quantities, sometimes their dimensions are not as specifically ordered to fit the holding device above described. That means, for instance, that perhaps the sticks S in the figures would be too wide on their flatwise dimension so that clamping plate 3 would bite into them too much on the throw of the lever and link mechanism of the actuating device. On the other hand, this supply of sticks might be short on the same dimension whereby clamping element 3 might not engage them sufficiently strongly when they are inserted in the socket openings of the holders 1 and 2. It would not be feasible, generally, to reject such a large supply of sticks even though thus imperfect. I, therefore, provide for the adjustment of pivot 24 whereby actuating link 23 under the impulse of bell crank lever 18 throws clamping plate 3 into gang engagement with the sticks. I have found that the most feasible way of affecting this adjustment is to alter the bearings of pivot or link shaft 24. Such shaft is received, according to my present invention, in bearings provided in bearing blocks 32 fixed to clamping plate 3, in the present instance by screws 33. As shown in Figures 12, 13 and 14, the tap holes of these screws are variously separated from the turning centers of the bearings in which shaft 24 fits. Thus, by interchanging the bearing blocks of Figures 12, 13 and 14 the throw of the clamping plate 3 is modified. To be more specific, assuming that the bearing block of Figure 12 is normal, the bearing block of Figure 13 through screw 33 is set back a little thereby reducing the throw. In the case of the bearing block of Figure 14 the screw holder is set forward a little thereby increasing the throw of the clamping plate 3 as controlled by the bearing of pivot or trunnion 24.

The downwardly extending flanges 34 upon the bottom holding plate 1 are in the nature of legs or skids upon which the dipping device rests on a flat surface.

In general, I wish to call attention in connection with the foregoing description to the following described advantages of my invention:

The plates 1, 2 and 3 constituting the major assembly of my device as herein described, are completely separable one from the other. They can be detached and individually cleaned or scalded to meet sanitary requirements. When they are being assembled or disassembled, it is obvious that upper holding plate 2 can be dropped down upon and immediately properly assembled with lower holding and tray plate 1 because of the inclines 8. Whether in assembly or disassembly, operating lever 18 with its stop 31 may be moved to the left from the position of Figure 7 until abutment 31 contacts the body of the plate and thus aline the detachable pivot 20 with the bayonet bearing slot 25. In any event, no other precise fitting of the parts is required.

Once clamping plate 3 has been assembled upon bottom holding plate 1 and upper holding plate 2 has been added it, of course, becomes necessary to secure the two holding plates together. The means I provide for accomplishing this comprises, in the present instance, a threaded bolt post 35 riveted at its base to bottom plate 1. It extends through a suitable slot (shown in dotted lines at 39 in Figure 2) in intermediate clamping plate 3 and finally projects, in the general assembly, through upper holding plate 2 where it terminates in a portion 36 headed over a wing nut 37. The slot 38 in upper holding plate 2 has the general contour of this wing nut. Therefore, it is obvious that by turning the wing nut into register with the last mentioned slot, plate 2 may be lifted off the same. When, however, wing nut 37 is turned down on the threads of the post and brought to rest crosswise of slot 38, as shown in Figure 2, the holding plates are interlocked.

I claim as my invention:

1. In a multiple stick holding device of the character described, the combination with upper and lower supporting plates having alined stick sockets therein, said plates being completely separable but normally held together in fixed relationship, of an intermediate relatively longitudinally movable stick clamping plate guided therebetween, and actuating means for the clamping plate comprising a unit carried wholly thereby to be removed from the supports bodily therewith.

2. In a multiple stick holding device of the character described, the combination with upper and lower supporting plates having alined stick sockets therein, said plates being completely separable but normally held together in fixed relationship, of an intermediate relatively longitudinally movable stick clamping plate guided therebetween, and actuating means for the clamping plate comprising a unit carried wholly thereby to be removed from the supports bodily therewith, said actuating means having a pivotal slip connection with one of the supports to react against the same in operation.

3. In a multiple stick holding device of the character described, the combination with upper and lower supporting plates having alined stick sockets therein, said plates being completely separable but normally held together in fixed relationship, of an intermediate relatively longitudinally movable stick clamping plate guided therebetween, and actuating means for the clamping plate comprising a unit carried wholly thereby to be removed from the supports bodily therewith, said actuating means embodying an operating lever, a link pivotally connecting such lever with the clamping plate and a trunnion on the lever, one of the supports being provided with an open bearing affording a slip connection with the trunnion.

4. In a multiple stick holding device of the character described, the combination with a pair of upper and lower parallel supporting plates having alined stick sockets therein, the lower plate being provided with laterally arranged handle supporting posts at one end, having indented portions in their sides provided with slots constituting open bearings endwise of the device, of an intermediate relatively longitudinally movable stick clamping plate guided therebetween, and actuating means for the clamping plate carried thereby and including operating levers provided with lateral trunnions adapted to be engaged with and disengaged from the bearings through endwise movement of the clamping plate.

5. In a multiple stick holding device of the character described, the combination with a pair of upper and lower parallel supporting plates having alined stick sockets therein, the lower plate being provided with laterally arranged handle supporting posts at one end, having indented portions in their sides provided with bayonet slots constituting open bearings endwise of the device, of an intermediate relatively longitudinally movable stick clamping plate guided therebetween, and actuating means for the clamping plate carried thereby and including operating levers provided with lateral trunnions adapted to be engaged with and disengaged from the bearings through endwise movement of the clamping plate, vertical portions of the bayonet slots furnishing locking shoulders against which the trunnions react in the normal actuation of the clamping plate.

6. In a multiple stick holding device of the character described, the combination with a lower supporting plate provided with side flanges and with pairs of laterally arranged handle supporting posts at its ends presenting inclined edges faced toward the center in the planes of the side flanges, of an upper detachable supporting plate having central side flanges overhanging those of the lower plate and having cutaway portions at the corners whereby shoulders are formed adapted to cooperate with the inclines on the posts to properly position the plates relatively as the upper one is lowered upon the lower one, the plates having alined stick sockets therein when assembled, and an intermediate relatively longitudinally movable stick clamping plate confined between the supporting plates.

7. In a multiple stick holding device of the character described, the combination with a lower supporting plate provided with side flanges and with pairs of laterally arranged handle supporting posts at its ends presenting inclined edges faced toward the center in the planes of the side flanges, of an upper detachable supporting plate having central side flanges overhanging those of the lower plate and having cutaway portions at the corners whereby shoulders are formed adapted to cooperate with the inclines on the posts to properly position the plates relatively as the upper one is lowered upon the lower one, the plates having alined stick sockets therein when assembled, a fixed threaded post rising from the floor of the lower plate and headed over at its upper free end, and a wing nut on the post, the upper plate being provided with an elongated slot accommodating the post and wing nut when the latter is not cross-wise of the slot, and an intermediate relatively longitudinally movable stick clamping plate confined between the supporting plates.

8. In a multiple stick holding device, the combination with upper and lower parallel and relatively fixed supporting plates, an intermediate relatively longitudinally movable stick clamping plate, the plates being provided with alined perforations constituting stick sockets and those in at least one plate each embodying tapered centering side walls and a relatively transverse straight end wall of a length not less than the thickness of the sticks to be held whereby the clamped stick is not mutilated or appreciably indented by the plate.

9. In a multiple stick holding device of the character described, the combination with upper and lower supporting plates having alined stick sockets therein, of an intermediate relatively longitudinally movable stick clamping plate guided therebetween, an actuating means for the clamping plate comprising a unit carried wholly thereby to be removed from the supports bodily therewith, said actuating means having a pivotal slip connection with one of the supports to react against the same in operation, and an operating member assembled with the actuating means aforesaid having a slip engagement with one of the parts whereby the said stick clamping plate is alined to move into a disassembled position automatically with the movement of the operating member to the position aforesaid.

10. In a multiple stick holding device of the character described, the combination with upper and lower perforated holding plates, of an intermediate clamping plate having generally alined perforations therein corresponding to those in the holding plates, an actuating mechanism for moving the clamping plate slidable relatively to the said holding plates, and means on one of the holding plates furnishing bearings for said actuating mechanism which means are open endwise of the combined upper and lower holding plates to permit unit removal of the said intermediate clamping plate and its actuating mechanism from between the holding plates.

CLARK T. CUTTING.